May 5, 1931.  G. K. BAINBRIDGE  1,803,991

PLASTIC MOLDING MACHINE

Filed May 12, 1930

INVENTOR
G. K. Bainbridge
BY
ATTORNEY

Patented May 5, 1931

1,803,991

UNITED STATES PATENT OFFICE

GEORGE K. BAINBRIDGE, OF RIPON, CALIFORNIA

PLASTIC MOLDING MACHINE

Application filed May 12, 1930. Serial No. 451,619.

This invention relates to machines for handling plastic material such as certain candy materials, dough and the like, my principal object being to provide a machine by means of which such material will be automatically transferred from a spherical, cylindrical or any other shaped or shapeless mass into a rectangular bar form of definite cross-sectional size. This machine is so constructed that it may be readily used in connection with the plastic cutting machine shown in my Patent No. 1,660,855 granted February 28, 1928, or that in my co-pending application for patent, Serial No. 455,237, filed May 24, 1930, as well as utilizing certain features of my original Patent, No. 1,192,156 dated July 25, 1916. When thus operated in connection with a cutting machine, the lumps of material, which are all the same size and weight, will be delivered as cut onto the molding machine; and such lumps will then issue from the machine in the form of individual and rectangular bars all the same length. The machine is therefore very useful in making bar candy and the bars as formed may then be trimmed if necessary and immediately raised as is customary without further handling or delay.

The machine may also be used to form a continuous bar from bulk material, in which case the said continuous bar may be severed at intervals, to form individual bars of the desired length, by any suitable means. This method of making the bars is serviceable either in connection with candy making or when handling dough for certain uses.

A further object is to construct the machine so that it may be easily adjusted to form bars of different width or thickness as may be desired.

A further object of the invention is to provide a simple and inexpensive device and yet one which will be exceedingly effective for the purpose for which it is designed.

These objects I accomplish by means of such structure and relative arrangements of parts as will fully appear by a perusal of the following specification and claims.

In the drawings similar characters of reference indicate corresponding parts in the several views.

Figures 1, 2:
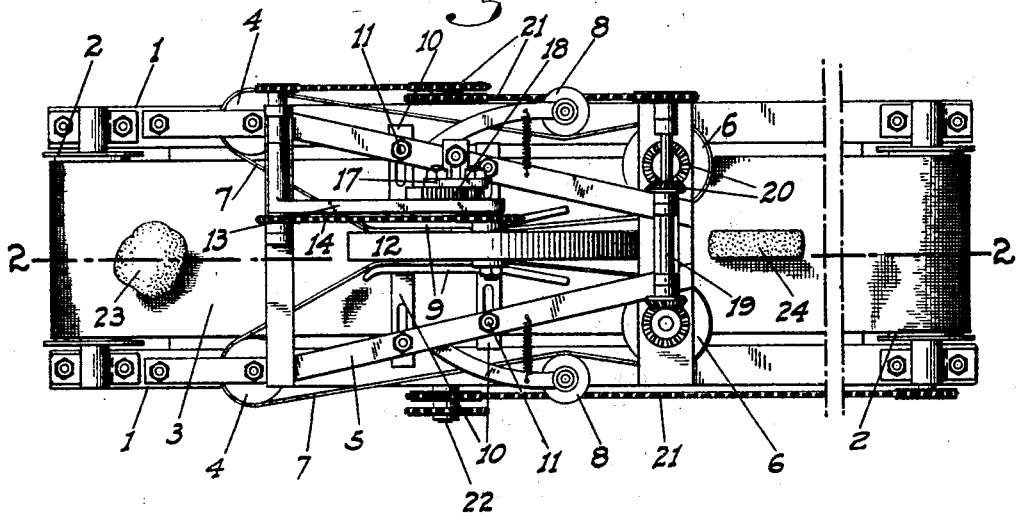
Fig. 1 is a top plan view of my improved molding machine.
Fig. 2 is a partial longitudinal section of the same taken on the line 2—2 of Fig. 1.

Referring now more particularly to the characters of reference on the drawings, the numeral 1 denotes the side frames of the machine, which adjacent their ends support transversely extending rollers 2. A relatively wide belt 3 is disposed about and extends between the rollers, the upper run of the belt being supported against sagging by a suitable flat member 1a supported from the frames. Disposed to the sides of and above the belt toward the forward end of the same are vertical rollers 4, which depend from and are supported by an auxiliary horizontal frame structure 5 which is disposed above and is supported by the main frames. A pair of other vertically disposed rollers 6, further toward the rear end of the belt and preferably closer together than the rollers 4 also depend from and are supported by said auxiliary frame. Endless belts 7 pass about the corresponding rollers 4 and 6, the bottom edges of these belts being as close to the upper run of the belt 3 as possible, so that practically no cracks or spaces are formed between the belt 3 and the adjacent runs of the belts 7. The desired tension on the belts 7 is maintained by suitable spring pressed idlers 8 engaging the outer or oppositely disposed runs of the belts 7.

For a certain distance intermediate the rollers 4 and 6, the adjacent runs of the belts 7 extend parallel to each other and are closer together than either pair of rollers. To maintain the belts in such relation, rigid vertical backing plates 9 engage the back faces of said runs of the belts. These plates are supported from the frame 5, for transverse adjustment relative to each other, by horizontal transversely extending bars 10 having longitudinal slots engaged by bolts 11 which clamp the bars and frame 5 together. Owing to this arrangement the belts 7 converge toward each other from the forward rollers 4, then extend parallel to each other along the straight portions of the plates 9, and then diverge to the rollers 6.

Protecting between the adjacent runs of the belts 7 is a disc 12, the sides of which lie as close to the belts as possible, but the bottom edge of which is spaced from the belt 3 a certain distance as plainly shown.

This disc is supported by a horizontal arm 13 which is turnable about a transverse shaft 14 mounted on the frame 5. A chain drive 15 between said shaft and the spindle 16 of the disc enables the latter to be driven regardless of the turning of the arm on its shaft. The turning of the arm of course alters the space between the bottom of the disc and the belt 3 and said arm is held rigid in any position by a clamping bar 17 connected to the arm 13 and straddling a curved bar 18 which is concentric with the shaft 14 and secured at its lower end to the adjacent frame 5. The rollers 6 are connected in driving relation with a transverse shaft 19 by means of suitable gearing; and said shaft, the shaft 14, and the rearmost roller 2 are all connected by chain drives 21 or the like, with the main drive shaft 22, which itself is driven by any suitable power means. These drives are all arranged so that the speed of the belts, and the peripheral speed of the disc, are all the same.

The space between the adjacent runs of the belts 7 governs the width of the bars being formed from the material; while the space between the bottom of the disc and the belt 3 governs the thickness or depth of the bars. It will therefore be seen that if the lumps of material, as shown at 23, are placed or dropped onto the belt 3 ahead of the belts 7, they will, with the travel of the belt, be moved between the converging belts and under the disc, and will be flattened out by contact with these elements. Said material will therefore issue from beyond the belts 7 and disc in the form of a flat bar 24, the length of which is of course determined by the size of the lump.

In connection with this machine a suitable dusting device is also of course provided as is customary, either to dust the belts themselves or the lumps before they are deposited on the belts, as in my Patent No. 1,192,156. This is necessary to prevent the adhesion of the material to the belts.

If a bar of a different thickness is desired it is only necessary to adjust the disc vertically in the manner previously described. If a bar of different width is desired the plates 9 are adjusted accordingly, and the disc is replaced by one of the corresponding width or so that it will fit snugly between the adjusted belts.

From the foregoing description it will be readily seen I have produced such a device as substantially fulfills the object of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In a shaping machine for plastic material having a horizontal movable belt to support and convey lumps of material, and an element above the belt to engage and cause the lump to be flattened with the advancing of the belt and lump, vertical transversely spaced belts disposed above the horizontal belt to the sides of the element and between which the latter projects; the adjacent runs of said vertical belts diverging widely from each other from said element to the side edges of the horizontal belt in the direction from which a lump is advancing.

2. In a shaping machine for plastic material having a horizontal movable belt to support and convey lumps of material, and vertical transversely spaced members to engage the lump advancing on the belt and give such lump a predetermined width, a lump flattening disc projecting between said members in spaced relation to the belt, a horizontal arm on one end of which the disc is mounted, a transverse shaft about which the other end of the arm is turnably supported, means for holding the arm against turning and at selective positions radially of the shaft, and drive connections between the shaft and disc.

3. In a shaping machine for plastic material having a horizontal movable belt to support and convey lumps of material, and vertical transversely spaced members to engage the lump advancing on the belt and give such lump a predetermined width, a lump flattening disc projecting between said members in spaced relation to the belt, a horizontal arm on one end of which the disc is mounted, a transverse shaft about which the other end of the arm is turnably supported, a fixed bar curved concentric with the shaft and disposed against one side of the arm intermediate its ends, means carried by the arm for clamping engagement with the bar, and drive connections between the shaft and disc.

In testimony whereof I affix my signature.

GEORGE K. BAINBRIDGE.